Patented Mar. 31, 1942

2,277,744

UNITED STATES PATENT OFFICE 2,277,744

PEST CONTROL

Martin E. Cupery and Arthur P. Tanberg, Wilmington, Del., assignors to E. I. du Pont de Nemours & Company, Wilmington, Del., a corporation of Delaware No Drawing. Application August 15, 1940, Serial No. 352,812

6 Claims. (Cl. 167—45)

This invention relates to pest control and is particularly directed to methods and compositions for the control of weeds, that is to say, economically harmful chlorophyl-bearing plants, which are characterized in that the active phytocidal principle is a sulfamate.

The control of weeds whether annual, biennial or perennial, or woody or succulent, by means of chemicals is becoming increasingly important, but the advance in this art is limited by the limitations of materials available for this purpose. Thus, of the more common weed killers the chlorates, including sodium and calcium chlorate, oils and carbon bisulfide involve dangerous fire hazards. Sodium arsenite, ammonium thiocyanate and carbon bisulfide are highly poisonous materials or are otherwise objectionable. Long time soil sterilization is also a problem encountered with some weed killers, particularly soluble arsenicals, oils and various soluble salts, unless proper precautions in application are taken. Other weed killers such as sulfuric acid whether used alone or combined with soluble arsenicals are highly corrosive to equipment and difficult to handle. Still other weed killers are selective in their action and many cause only wilting of foliage on woody plants without any permanent killing back of the woody structure.

We have now found that effective chemical control of a wide variety of weeds including that pestiferous woody perennial, poison ivy, can be obtained by the application of a sulfamate to the foliage. By spraying the foliage of the weeds with an aqueous solution of sulfamate, especially ammonium sulfamate, we are able effectively to control a wide variety of weeds without the disadvantages characteristic of the prior art weed killers.

While various sulfamates, including sulfamic acid (hydrogen sulfamate), sodium sulfamate, potassium sulfamate, and the like, may be used in the compositions and processes of our invention, ammonium sulfamate has been found to possess the more desirable combination of properties useful in weed control. Ammonium sulfamate is highly soluble in water and may be easily applied to weed foliage from aqueous solutions containing from about three to twenty per cent. It is hygroscopic at relative humidities above about seventy per cent and when dried on the foliage or on clothing of the operator does not have any fire hazard as in the case of sodium chlorate. Quite the contrary, ammonium sulfamate has a fireproofing action so that the withered foliage coated with ammonium sulfamate or the operator's clothing impregnated therewith is actually more resistant to combustion that if it were not so treated. The other sulfamates have a fireproofing action also, though not to the extent of ammonium sulfamate. None of them present the fire hazard of the chlorates.

In addition to ammonium sulfamate, sulfamic acid and the metallic derivatives of sulfamic acid we may use the organic ammonium derivatives, that is, the amine salts of sulfamic acid. Thus we may use salts derived from the mono-, di- and tri- methyl, ethyl, and ethanol amines; dodecylamine and the amines derived from coconut oil alcohols known commercially as "Lorol" amine; and ethylene diamine, hexamethylene diamine, and other polyamines such as diethylene triamine and triethylene tetramine. These amine salts may suitably be used in combination with ammonium sulfamate.

The sulfamates, including sulfamic acid, may be applied simply from aqueous solution and may also be applied with certain advantages in combination with a hygroscopic agent such as calcium chloride, zinc chloride, glyceryl ammonium sulfate, glycerol, sorbitol, glucamine, glycol and diethylene glycol ethers, ammonium thiocyanate, polyvinyl alcohol, and other water-miscible organic substances of high molecular weight such as polyglycols, polyclycerols, (polyethanoxy) glycerols and their ether, ester and amine derivatives, and in general substances of the character described in U. S. Patent 2,144,647 granted January 24, 1939, as well as substances of the character set forth in French Patent 845,388.

Wetting agents may also be included. Sodium lauryl sulfate, sodium salts of alkyl naphthalene sulfonic acids, long-chain C- or N-substituted betaines, long-chain quaternary ammonium salts, salts of long-chain aliphatic secondary sulfonic acids such as those described in U. S. Patent 1,242,162, sodium salts of alkyl sulfonic acids derived from petroleum as described in U. S. Patent 2,197,800 and like wetting agents may be employed.

The sulfamates may also be used in conjunction with other weed killing agents. Thus, the sulfamates may be mixed with ammonium thiocyanate, sodium arsenite, chlorates (ammonium salts are of course incompatible with chlorates), and like highly active weed killers, or they may be used in conjunction with other sulfamates. For example, mixtures of ammonium sulfamate and sulfamic acid provide the advantages of both the acid and the sulfamate coupled with the higher solubility of the ammonium sulfamate.

Other methods of application may be employed and other ingredients may be added or different compositions may be prepared according to the requirements of the different methods of application. For example, the sulfamates may be applied as a dust. In such case it is an advantage to include an inert finely divided diluent such as calcium carbonate, talc, bentonite and the like. Such dusts may be prepared as is customary with pest control compositions and applied to the foliage preferably when the foliage is covered with dew. The dry sulfamates are not actively weed killing agents but become so in the presence of water which may be supplied either by a spray solution as described above or by the moisture on the plant foliage, or by subsequent rain or watering. In many cases the maximum killing effect is obtained only after rain or a period of high humidity irrespective of whether the application is made from a solution or otherwise. In general the methods commonly recommended for the application of translocated sprays may be followed.

The compositions of our invention may include basic substances such as the calcium carbonates mentioned, sodium tetraborate, trisodium phosphate and the like. The compositions also may include fertilizers to aid in preventing sterilization of highly treated plots. The sulfamates may also be used in acid solutions to obtain the greater penetrating and wetting effect of the acid solution and also to obtain the withering effect of the acid on the foliage. Sulfuric acid is the cheapest and most commonly used acid and is suitable.

In making up composite compositions containing more than one weed killing agent base exchange may be used to advantage. Thus we are able to mix ammonium sulfamate and sodium thiocyanate, which in the dry state does not have the disadvantages of ammonium thiocyanate but which in solution has all the advantages thereof plus the added advantages of the sodium and ammonium sulfamates.

The effectiveness of the methods and compositions of our invention is shown in the following examples:

Example 1

Small plots about eight feet square covered with mixed annual weeds were treated with finely divided, solid materials including ammonium sulfamate, sulfamic acid, sodium chloride and sodium chlorate in equivalent concentrations. The ammonium sulfamate and sulfamic acid were more effective on an equal weight basis than sodium chloride and approximately equal to sodium chlorate.

Example 2

Plots about 5 x 8 feet in size located along an old fence contained a variety of annual and perennial weeds including ragweed, wild parsnip, wild daisy and considerable poison ivy. These plots were sprayed with aqueous solutions at a concentration of from one-half to one pound per gallon of water and at a rate such as to give ten pounds of the salt per one thousand square feet. Comparative tests showed that at equal concentrations sodium sulfamate was slightly less effective than ammonium sulfamate but more effective than calcium sulfamate. Ammonium sulfamate at the above concentrations appeared to be just as effective as sodium chlorate at the same concentrations and it was observed that poison ivy was particularly sensitive to the ammonium sulfamate spray treatment. No appreciable new growth appeared even though some of the applications were made early in the season and in some cases carried out only a few hours before a heavy rain. Examination of the same plots in the following season have not shown any indication that the poison ivy will grow again.

Example 3

The plots involved in this treatment each contained a post heavily covered with poison ivy which extended to a height of at least six feet. For six feet on each side of this post in every direction, making a total area of 144 square feet, all the plants were sprayed. Two gallons of spray containing one pound per gallon of weed killer were applied to each plot. Included in the plots were such weeds as fall aster, golden rod, yarrow, fireweed, one of the wild oat grasses, wild lettuce, horsenettle, ragweed, Queen Anne's lace (wild carrot) and others. All the succulent annual or perennial weeds were killed equally well by ammonium sulfamate, ammonium thiocyanate and sodium chlorate.

The most significant difference was observed in connection with the woody perennial weeds such as poison ivy. In these tests ammonium sulfamate was strikingly more effective than ammonium sulfate and ammonium thiocyanate and equally as effective as sodium chlorate. The poison ivy was wilted at the end of one hour, completely wilted and bleached within twenty-four hours, and the plant apparently was dead within one month. At that time examination of shoots more than eighteen inches long revealed that the wood was dead and notwithstanding heavy rains no new growth has appeared. Essentially the same results were obtained with sodium chlorate, but in the case of ammonium thiocyanate new growth subsequently appeared at the base of the dead shoots and in the case of the ammonium sulfate there was little apparent damage other than defoliation.

While we have illustrated our invention with particular reference to fairly concentrated solutions it will be understood that more dilute solutions may be employed. The strength of the solution employed will depend upon the purpose of the application. If the application is made primarily to kill off succulent annual weeds more dilute solutions, around two and three per cent, will frequently be sufficient. In such cases the sulfamate is applied as a contact herbicide. When applied as a translocated spray higher concentration is required, in order that sufficient of the sulfamate may be applied to the foliage and taken up by the plant to kill the roots and woody stock.

The sulfamates are particularly desirable for weed control in that they involve no hazard of application that is, they are non-poisonous and do not support combustion. They open an entirely new field of weed control to the small land owner because they can be applied without special equipment, and without danger either thru poison or fire to the operator, to children, to animals or to property. They may be applied with an ordinary garden sprayer or for that matter from a sprinkling can. Another important advantage is that they can be applied without danger of long time soil sterilization. The sulfamates thus provide a combination of properties germane to weed control not possessed by any of the weed killing agents heretofore available.

We claim:

1. A weed control composition containing as an essential active ingredient a sulfamate.

2. A weed killing composition containing as an essential active ingredient a salt of sulfamic acid.

3. A weed control composition containing as an essential active ingredient ammonium sulfamate.

4. The method of controlling weeds which comprises contacting the foliage with an aqueous solution of a sulfamate.

5. The method of controlling weeds which comprises contacting the foliage with an aqueous solution of ammonium sulfamate.

6. A weed killing composition containing a sulfamate and a hygroscopic substance.

MARTIN E. CUPERY.
ARTHUR P. TANBERG.